United States Patent [19]

Watabe et al.

[11] Patent Number: 5,682,645

[45] Date of Patent: Nov. 4, 1997

[54] CONTROL ASSEMBLY FOR A HINGE CONNECTION

[75] Inventors: Koichi Watabe, 5-103, Kyokoji, Yao-Shi, Osaka; Takasi Katagiri, Tokushima, both of Japan

[73] Assignees: Koichi Watabe; Yoshiaki Watabe, both of Osaka, Japan

[21] Appl. No.: 743,919

[22] Filed: Nov. 5, 1996

Related U.S. Application Data

[63] Continuation of Ser. No. 299,754, Sep. 1, 1994, abandoned.

[30] Foreign Application Priority Data

Oct. 18, 1993 [JP] Japan ................. 5-284399

[51] Int. Cl.$^6$ ................. E05D 11/08
[52] U.S. Cl. ................. 16/338; 16/342; 296/97.12; 361/681
[58] Field of Search ................. 16/225, 228, 337, 16/338, 339, 340, 342, 383; 361/681, 683; 296/97.12, 97.8, 97.9

[56] References Cited

U.S. PATENT DOCUMENTS

| 2,322,898 | 6/1943 | Van Dresser | 16/338 |
|---|---|---|---|
| 2,828,668 | 4/1958 | De Angelis | 16/228 |
| 3,040,339 | 6/1962 | Sperzel | 16/338 |
| 4,824,161 | 4/1989 | Lee | 16/338 |
| 4,964,193 | 10/1990 | Rommelfaenger et al. | 16/225 |
| 5,018,244 | 5/1991 | Hino | 16/342 |
| 5,031,275 | 7/1991 | Chiang | 16/342 |
| 5,052,078 | 10/1991 | Hosoi | 16/342 |
| 5,333,356 | 8/1994 | Katagiri | 16/340 |
| 5,390,075 | 2/1995 | English | 16/386 |

FOREIGN PATENT DOCUMENTS

| 594188 | 3/1934 | Germany | 16/338 |
|---|---|---|---|
| 56-115345 | 9/1981 | Japan . | |
| 57-140354 | 9/1982 | Japan . | |
| 58-29945 | 2/1983 | Japan . | |
| 58-148165 | 10/1983 | Japan . | |
| 58-174463 | 11/1983 | Japan . | |
| 58-195766 | 12/1983 | Japan . | |
| 58-171468 | 11/1993 | Japan . | |
| 1039036 | 8/1966 | United Kingdom | 16/338 |

*Primary Examiner*—W. Donald Bray

[57] ABSTRACT

A control assembly for a hinge connection is mounted within a lap top, palm top or handy personal computer, or the like. The assembly comprises an elongated pivot member, a brake member disposed around the pivot member, a small-scaled holding member fixedly secured to the display unit or a computer body, and adjusting means for clamping the holding member against the brake member. The holding and brake members have a barrel portion for setting the pivot member and two leaf portions, respectively. Furthermore, the inner surface of the holding member corresponds to the outer surface of the brake member. Thus, the brake member is rotatable about the pivot member together with the holding member.

5 Claims, 3 Drawing Sheets

CONTROL ASSEMBLY FOR A HINGE CONNECTION

This application is a continuation of application Ser. No. 08/299,754, filed Sep. 1, 1994, now abandoned.

BACKGROUND OF THE INVENTION

The present invention relates a small-scaled control assembly with a plastic brake member and a holding member, and more particularly to a control assembly for a hinge connection employed for several personal computers with an opening and closing display unit, a facsimile receiver with a cover for putting a roll of sensitive paper in storage, a stand for a portable television set or the like.

Lap top, palm top or handy personal computers must be made as compact and light as possible for convenience of carrying. Also, they must be so constituted that a small display unit with a liquid crystal panel can open and close. In order to rest the display unit at a desired position as it turns about an angle of almost 120° from the surface of the body, the computer is required to be provided with an assembly for controlling the turn of a pivot attached to a hinge. It is also necessary to reduce the area occupied by the control assembly as much as possible because many electronic circuit substrates are present and panel wires are complexly distributed within the personal computer.

The known control assembly used for opening and closing the display unit has a thick coil spring fastened around the hinge pivot and both ends of the coil spring are fixed to the holding member. As the pivot is tightened with strong torsion of the spring, the display unit rests at a desired opening position. With relation to the known assembly, about two times the force is required to start the opening and closing motion as compared with the turning movement of the display unit, as it is impossible to control the opening and closing motion due to constant tightening of the hinge pivot with uniform strong torsion. In case the opening and closing motion of the display unit is carried out repeatedly, a contact part of the pivot with the spring is worn out and frictional resistance in the hinge increases more and more as metal grounds enter into the contact part. Consequently, the opening and closing motion of the display unit becomes difficult. Also, the cost of producing the known assembly is very expensive because the inner surface of the spring and the outer surface of the pivot are required to maintain a high accuracy to keep uniform torsion.

According to several opening and closing devices for electric goods with a lid, there had already proposed, for example, as described in Japanese Open Publication No. 56-140354, 57-115345, 58-29945, 58-148165, 58-171468, 58-174463 or 58-195766. Since the devices mentioned above are disposed vertically in any case, it is impossible substantially to dispose one of the devices inside a portable and small-scaled electronic product such as a palm top, lap top or notebook-sized personal computer. Furthermore, Katagiri, one of inventors who applied the present invention, has proposed a novel small-sized control assembly in U.S. patent application Ser. No. 967,825 now U.S. Pat. No. 5,333,356. By the use of the assembly, a display unit can be easily and smoothly opened and closed by hand and rested the section at a desired turning position. However, the assembly is relatively complex and expensive.

SUMMARY OF THE INVENTION

The present invention provides a control assembly for a hinge connection between a first segment and a second segment. The hinge connection may be used for a notebook-sized, lap top or palm top computer with an opening and closing display unit, a facsimile receiver with a cover for putting a roll of sensitive paper in storage, a small-sized television set as attached to automobile, a fish detector with a display monitor, a stand for a portable television set, an adjustable lamp with support arms, or electric goods with a lid. Also, the assembly of this invention may be applied to a window or lid hinge mounted to various articles of furniture or automobile. It is possible to arrange the assembly for one or both of the hinge connections, e.g., one or both side connections between a display unit and a computer body.

The assembly has an elongated pivot mounted to the first segment, e.g., the computer body or the display unit, a brake member disposed around the pivot member, a small-scaled holding member fixedly secured to the second segment, e.g., the display unit or the computer body, and adjusting means for clamping the holding member. The holding and brake members have a barrel portion and two leaf portions, respectively. The inner surface of the holding member corresponds substantially to the outer surface of the brake member. The brake member may be usually made of hard plastics, e.g., engineering plastics that is excellent in durability, and the holding member may be made of spring steel. When observed the holding and brake members from the side, preferably the lower leaf portion extends along a tangent line of the circular barrel portion, and the upper leaf portion extends parallel to the lower leaf portion with a desired distance. When the holding member is fixedly secured to the corner of the display unit, the brake member turns together with the holding member.

The adjusting means may be a screw or bolt put in each slot of the upper and/or lower leaf portions of the holding and the brake members. It is possible to attach the adjusting means to the computer body, as shown in FIG. 9. By tightening the screw or bolt, the barrel portion of the holding member is so clamped radially that the brake member is effectively urged against the pivot. The clamping of the brake member down on the pivot is adjustable by tightening or loosening with the screw or bolt.

The various aspects of the invention will be more fully understood when the following portions of the specification are read in conjunction with accompanying drawings wherein:

It is accordingly the object of the invention to provide a control assembly for a hinge connection, which is relatively simple and inexpensive.

It is the another object of the invention to provide a control assembly for opening and closing easily and smoothly a turning section of a hinge connection by hand and resting the section at a desired turning position.

It is still another object of the invention to provide a small-scaled control assembly which can be mounted on a first or second segment even if there is only a small setting space.

These and other objects, features and advantages of the invention will become more apparent to those skilled in the art from the following description.

DETAILED DESCRIPTION OF THIS INVENTION

Figure 1:
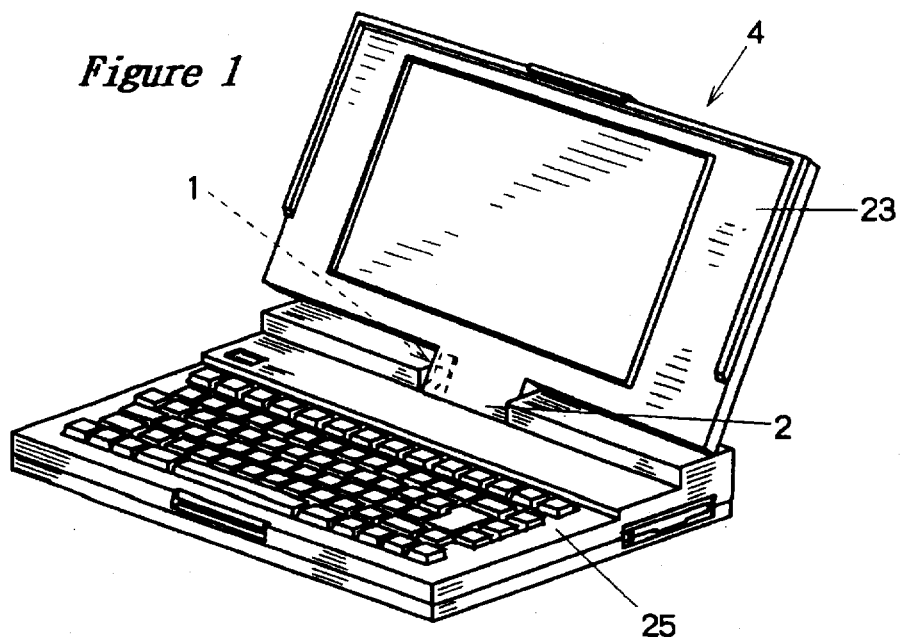
FIG. 1 is a schematic perspective view of a notebook-sized personal computer with the control assembly of this invention.
Figure 2:
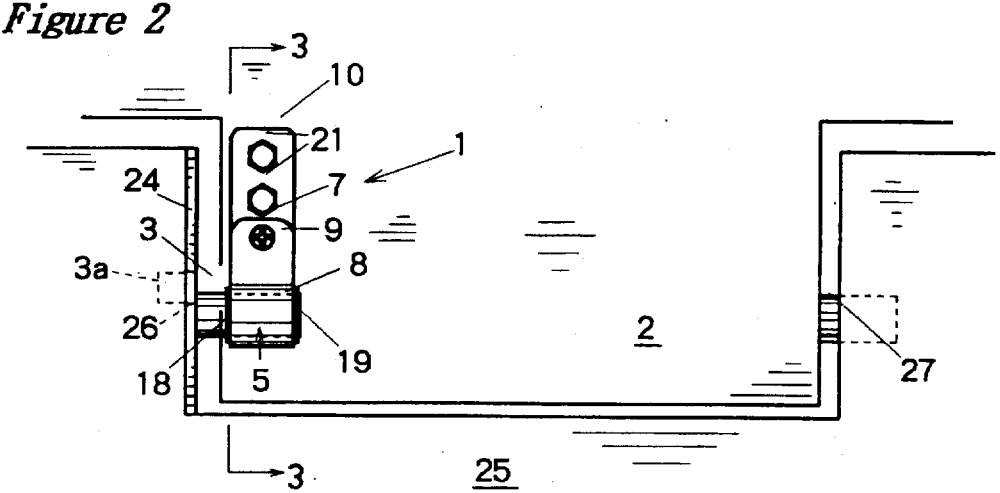
FIG. 2 is a partial elevational view of the hinge section of the computer shown in FIG. 1.
Figure 3:
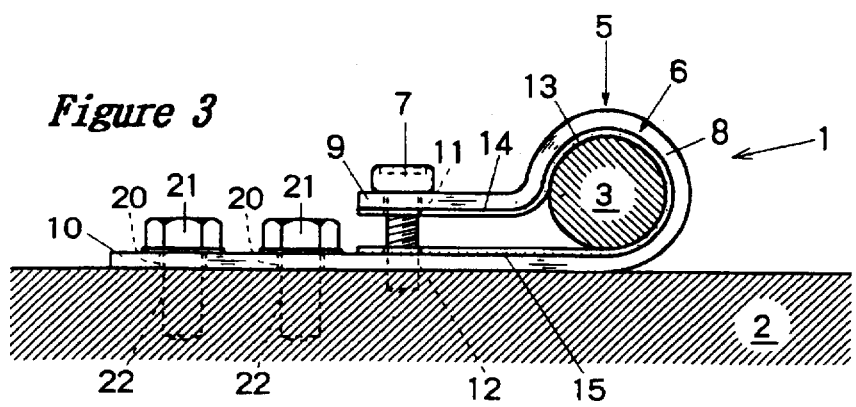
FIG. 3 is an enlarged partial cross sectional view taken on line 3—3 of FIG. 2.

Referring to the drawings, FIGS. 2 and 3 illustrate the general organization of a control assembly 1 according to the present invention. As seen in FIG. 1, the assembly 1 is mounted on a turning section, i.e., the lower projection 2 of a display unit 23 of a notebook-sized computer 4.

The assembly 1 includes a holding member 5 made of spring steel which has a barrel portion 8 and two leaf portions 9 and 10. When observed the holding member 5 from the side, as shown FIG. 3, the lower leaf 10 extends along a tangent line of the circular barrel portion 8, and the upper leaf 9 extends parallel to the lower leaf 10 with a desired distance. The lower leaf 10 is generally much longer than the upper leaf 9. In this Example, the lower leaf 10 is 23 mm. and the upper leaf 9 is 10 mm. in length, which are generally the same width as the barrel portion 8. A penetration slot or 12 for an adjusting screw 7 is made in the leaves 9 and 10, respectively, and the slot 11 aligning vertically with the slot 12. The lower leaf 10 only has two penetration bolt holes 20 and 20.

Figure 4:
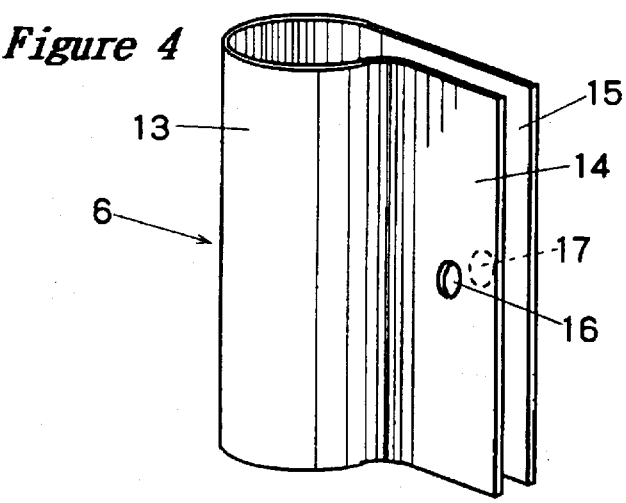
FIG. 4 is an enlarged perspective view of a brake member used in the control assembly shown in FIG. 3.

As shown in FIGS. 3 and 4, a brake member 6 having a barrel portion 13 and two leaf portions 14 and 15 is arranged within the holding member 5. The outer surface of the barrel 13 of the brake 6 corresponds to the inner surface of the holding barrel 8. Usually the width of the brake member 6 is as same as that of the holding member 5. The upper leaf 14 is the same length as the upper leaf 9, but the lower leaf 15 is shorter than the lower leaf 10. The leaves 14 and 15 of the brake 6 have a penetration slot 16 or 17 for an adjusting screw 7, respectively, the slots 16 and 17 thereof aligning vertically with the slots 11 and 12 of the holding member 5. The brake member 6 is an injection molding made of wear-resistant engineering plastics, e.g., polyacetal resin containing carbon fiber.

The adjusting screw 7 having a cross recessed head is put in the slots 11, 16, 12 and 17 of the leaves of the holding and brake members 5 and 6. For attaching the screw 7 to the holding member 5, the slot 12 is tapped and/or a tapped hole is formed on the projection 2 under the slot 12.

An elongated pivot 3 is rotatably put in the barrel portion 13 of the brake member 6. The pivot 3 projects from the one side of the holding member 5. On a top portion 3a (see FIG. 2) of the pivot 3, there is generally formed to a heterogeneous cross-section such as a modified round or square section. Two E-shaped fittings 18 and 19 are attached to two circumferential grooves (not shown) formed on the pivot 3, respectively. The fittings 18 and 19 are placed on the both sides of the holding member 5 to prevent the pivot 3 from coming off the holding member 5. In this Example, the pivot 3 is 4 mm. in diameter. Instead of one of the fittings 18 and 19, a collar with large diameter may be formed on the circumference of the pivot 3.

As seen in FIG. 2, a receiving plate 24 having a hollow 26 of a heterogeneous cross-section is held in an adjacent side of a computer body 25. The cross-section of the hollow 26 is similar to that of the pivot portion 3a. Firstly, another pivot 27 is mounted to the other side of the lower projection 2 of the display unit 23 in a known means. Then, the pivot portion 3a is inserted into the plate hollow 26. The assembly 1 is fixedly secured on one side of the lower projection 2 by tightening the bolts 21 into the tapped holes 22 formed on the projection 2 of the display 23. The assembly 1 is positioned vertically so that the pivots 3 and 27 for the display unit 23 are disposed coaxially to each other.

When opening and closing the display unit 23, the holding and brake members 5 and 6 turn simultaneously because the assembly 1 rotates with the display unit 23. At this time, the pivot 3 rests in the brake barrel 5 because the portion 3a thereof is held in the hollow 26 of the plate 24 fixed to the body 25. Since the holding member 5 is clamped inward by tightening the screw 7, the brake member 6 is compressed radially inward and contracts easily against the pivot 3. As this result, the brake 6 clamps down on the pivot 3 and rests the display unit 23 at a desired turning position. It is certain that the brake member 6 turns or rests together with the holding member 5 when turning the display unit 23. Since the inner surface of the brake member 6 is slid on the circumference of the pivot 3, the compressed brake 6 keeps effectively the rotation of the pivot 3 under control. The effect of the brake 6 which clamps down on the pivot 3 for the display unit 23 is easily adjustable by tightening or loosening with the screw 7.

Figure 5:
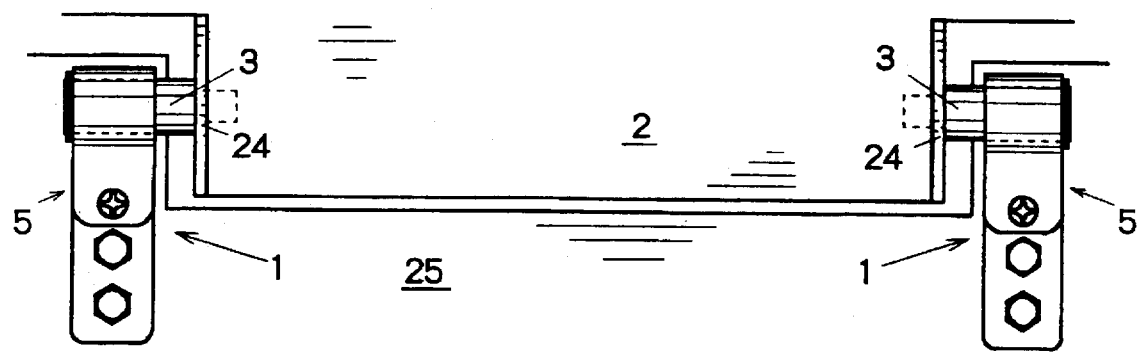
FIG. 5 is a partial elevational view of the hinge section of another computer.

The assembly 1 of this invention may be bolted on the computer body 25, as shown in FIG. 5. It is also possible to secure two assemblies 1 on each adjacent side of the computer body 25. In this case, it is necessary to mount the receiving plates 24 having the hollow on each side of the lower projection 2 of the display unit 23.

It is possible to produce the assembly 1 of this invention inexpensively as the structure thereof is very simple and parts used are few. Furthermore, the assembly 1 is excellent in durability because it can tolerate an opening and closing test which was done tens of thousands of times.

Figure 6:
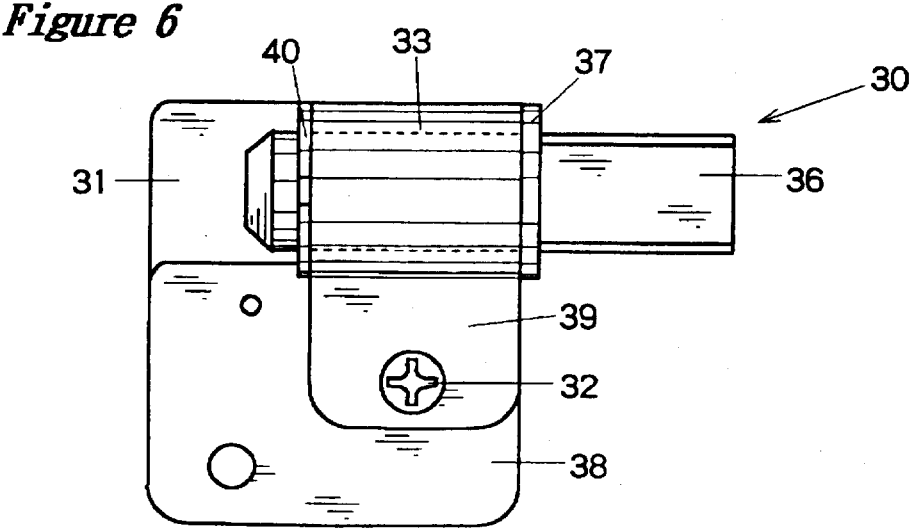
FIG. 6 is an enlarged plan view of an alternative embodiment of this invention.
Figure 7:
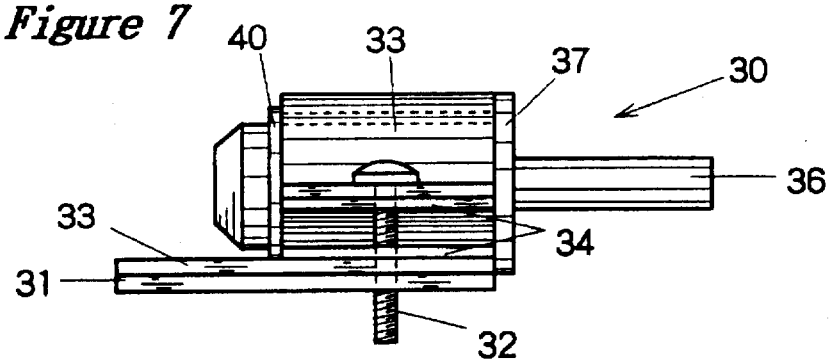
FIG. 7 is an enlarged side view of the assembly in FIG. 6.

The embodiment of FIGS. 6 and 7 is similar to that above described with the exception that it is provided with a flat support plate 31. According to this assembly 30 for opening and closing a cover of a facsimile receiver (not shown), a tapped hole for tightening an adjusting screw 32 is made in the plate 31 and a penetration slot is made in two leaves of a holding and brake members 33 and 34. An elongated pivot 36 is rotatably put in the barrel portion of the brake member 34. When the pivot 36 is inserted into the barrel portion of the brake 34, a fixed collar 37 thereof comes in contact with the one side of the holding member 33 and an E-shaped fitting 40 is then attached to the pivot 36 at the other side of the holding member 33. In this Example, the lower leaf 38 of the holding member 33 is 15 by 20 mm. and the upper leaf 39 is 10 by 12 mm. in dimensions, the brake 34 is 12 mm. in width and the pivot 36 is 4 mm. in diameter.

According to the assembly 30, an opening and closing test was performed at intervals of four seconds under the condition of a rotatory angle from 0° to 110° and opening and closing speed of one second. The result of the test was as follows:

| Number of Times (×100) | Sample No. 1 | Sample No. 2 Torque(kgf · mm) | Sample No. 3 |
| --- | --- | --- | --- |
| start | 76 | 65 | 65 |
| 5 | 76 | 65 | 65 |
| 10 | 76 | 65 | 70 |
| 20 | 74 | 65 | 75 |
| 30 | 74 | 65 | 78 |
| 40 | 76 | 65 | 81 |
| 50 | 76 | 65 | 78 |
| 70 | 76 | 60 | 78 |
| 100 | 74 | 60 | 78 |
| 130 | 74 | 58 | 77 |
| 170 | 66 | 55 | 70 |
| 200 | 65 | 52 | 60 |

After the test was done 20,000 times or more, a decrease in torque was under 20% about the assembly 30. On the contrary, it was probably impossible to use a conventional assembly without a plastic brake by opening and closing operations only about one hundred times. Furthermore, according to another conventional assembly with a cylindrical plastic brake, a decrease in torque was above 20% when the test was done only about thousands of times. Thus, the assembly 30 is excellent in durability as compared with the conventional assemblies.

Figure 8:
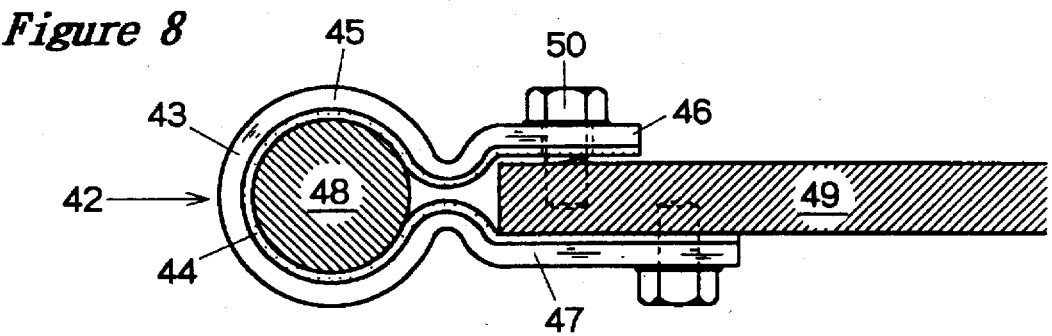
FIG. 8 is an enlarged cross sectional view showing a third embodiment.

FIG. 8 illustrates another modification of this invention. An assembly 42 has a holding and brake members 43 and 44 with a barrel 45 and two leaf portions 46 and 47. The barrel portion 45 is disposed around the pivot member 48 mounted to the first segment, e.g., a computer body (not shown). A second segment, e.g., the side end of a display unit 49 is held between the leaf portions 46 and 47 of the holding and brake members 43 and 44. An adjusting bolt 50 is put in a slot of the upper leaves 46 and attached to the upper side of the display unit 49. The lower leaf 47 is bolted on the lower side end of the display unit 49.

Figure 9:
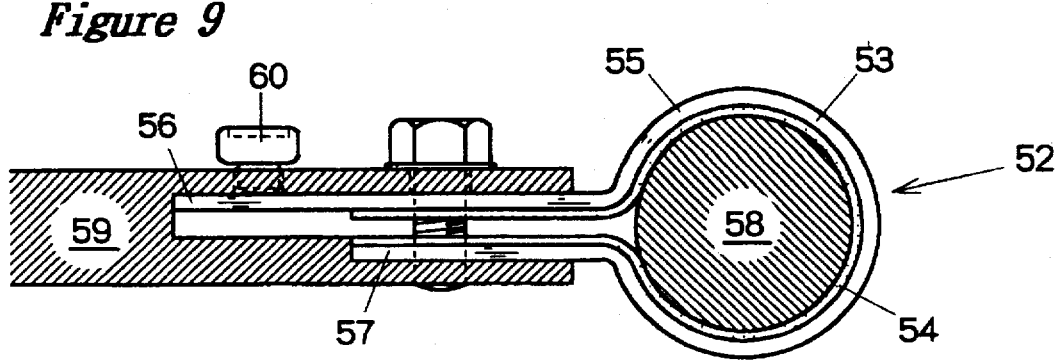
FIG. 9 is an enlarged cross sectional view showing a fourth embodiment.

FIG. 9 shows still another modification of the invention. An assembly 52 has a holding and brake members 53 and 54 with a barrel 55 and two leaf portions 56 and 57. The barrel portion 55 is disposed around the pivot member 58 mounted to the first segment, e.g., a display unit (not shown). The leaf portions 56 and 57 are inserted into and bolted to a side slot of a second segment, e.g., a computer body 59. An adjusting screw 60 is put in a tapped hole formed on the upper surface of the computer body 59.

What is claimed is:

1. A control assembly for a hinge connection between a display unit and a computer body, said assembly comprising:

a pivot member mounted to the computer body or the display unit;

a brake member made of hard plastic or plastics with minimum variation in wall thickness, which has a barrel portion disposed around the pivot member and two leaf portions with a space therebetween, whereby it introduces no new internal stresses;

a holding member made of steel and connected to the display unit or the computer body, which has a barrel portion and two leaf portions corresponding substantially to the outer surface of the brake member, whereby said brake member is protected against distortions when compressed hard and is rotatable about the pivot member together with said holding member; and adjusting means for clamping the holding member against the brake member so that the barrel portion of the brake member compresses radially into frictional contact with the pivot member.

2. An assembly as set forth in claim 1, in which the adjusting means includes a screw put in slots made in the two leaf portions of the holding and barrel members.

3. An assembly as set forth in claim 1, in which the brake member is made of wear-resistant engineering plastic or plastics and the holding member is made of spring steel.

4. An assembly as set forth in claim 1, in which the lower leaf portion extends along a tangent line of the circular barrel portion, and the upper leaf portion extends parallel to the lower leaf portion along a desired distance.

5. An assembly for controlling the rotation of a display unit of a personal computer, said assembly comprising:

an elongated pivot member mounted to the computer body or the display unit;

a brake member made of engineering plastic or plastics with minimum variation in wall thickness, which has a barrel portion disposed around the pivot member and two leaf portions with a space therebetween, whereby it introduces no new internal stresses;

a holding member made of spring steel and connected to the display unit or the computer body, which has a barrel portion and two leaf portions, including the lower leaf portion extending along a tangent line of the barrel portion and an upper leaf portion extending parallel to the lower leaf portion with a desired distance, the inner surface of the holding member corresponding to the outer surface of the brake member, said brake member being rotatable about the pivot member together with said holding member; and a screw put in slots made in the two leaf portions of the holding member and the brake member, for screwing up or clamping the holding member against the brake so that the holding member compresses the brake radially into friction contact with the pivot member.

* * * * *